(12) United States Patent
Lunzman et al.

(10) Patent No.: US 8,403,098 B2
(45) Date of Patent: Mar. 26, 2013

(54) WORK MACHINE HYDRAULICS CONTROL SYSTEM

(75) Inventors: Stephen V. Lunzman, Chillicothe, IL (US); Muhammed Were, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 2303 days.

(21) Appl. No.: 11/067,271

(22) Filed: Feb. 28, 2005

(65) Prior Publication Data
US 2006/0191732 A1    Aug. 31, 2006

(51) Int. Cl.
*B60K 17/10* (2006.01)
(52) U.S. Cl. .................................. 180/307; 180/308
(58) Field of Classification Search .............. 180/305, 180/307, 308
See application file for complete search history.

(56) References Cited

U.S. PATENT DOCUMENTS

| | | | |
|---|---|---|---|
| 3,295,620 A | 1/1967 | Messenger | |
| 3,667,225 A | 6/1972 | Karman | |
| 3,795,107 A | 3/1974 | Ward | |
| 3,862,668 A | 1/1975 | Ward | |
| 3,872,669 A | 3/1975 | Ward | |
| 3,917,014 A | 11/1975 | Ward | |
| 4,139,987 A | 2/1979 | Budzich | |
| 4,399,653 A | 8/1983 | Pylat, Jr. | |
| 4,487,109 A | 12/1984 | Burandt et al. | |
| 4,655,689 A | 4/1987 | Westveer et al. | |
| 4,699,021 A | 10/1987 | Waddington | |
| 5,232,406 A | 8/1993 | Sato | |
| 5,289,100 A | 2/1994 | Joseph | |
| 5,325,933 A | 7/1994 | Matsushita | |
| 5,390,759 A * | 2/1995 | Gollner | 180/307 |
| 5,525,043 A | 6/1996 | Lukich | |
| 5,810,106 A * | 9/1998 | McCoy | 180/243 |
| 5,948,029 A | 9/1999 | Straetker | |
| 6,067,795 A * | 5/2000 | Iino et al. | 60/327 |
| 6,138,782 A | 10/2000 | Anderson et al. | |

(Continued)

FOREIGN PATENT DOCUMENTS

| | | |
|---|---|---|
| GB | 1 498 883 | 1/1978 |
| JP | 63-5121 | 1/1988 |

(Continued)

OTHER PUBLICATIONS

English-language Abstract of JP 63/5121.

(Continued)

*Primary Examiner* — John R Olszewski
(74) *Attorney, Agent, or Firm* — Finnegan, Henderson, Farabow, Garrett & Dunner LLP

(57) ABSTRACT

A hydraulic power control system for a work machine is provided. The system may include a hydraulic power output device selected from the group consisting of a hydraulic motor and a work implement hydraulic actuator. The system may also include a variable displacement hydraulic pump configured to supply hydraulic fluid to the hydraulic power output device. The system may further include at least one pressure sensor configured to measure pressure of the hydraulic fluid at a location between the pump and the hydraulic power output device. In addition, the system may include at least one temperature sensor configured to measure a temperature of the hydraulic fluid in the system. The system may include a controller configured to control a displacement of the pump based on a pressure measurement of the at least one pressure sensor and a temperature measurement of the at least one temperature sensor.

29 Claims, 4 Drawing Sheets

U.S. PATENT DOCUMENTS

| | | | |
|---|---|---|---|
| 6,202,783 B1 | 3/2001 | Taylor et al. | |
| 6,339,928 B1* | 1/2002 | Gollner | 60/464 |
| 6,347,517 B1 | 2/2002 | Sereni | |
| 6,408,975 B1 | 6/2002 | Bishop et al. | |
| 6,524,076 B2 | 2/2003 | Konishi | |
| 6,644,429 B2 | 11/2003 | Evans et al. | |
| 6,684,636 B2 | 2/2004 | Smith | |
| 6,686,713 B2 | 2/2004 | Desbiolles et al. | |
| 6,921,109 B2 | 7/2005 | Hutchison et al. | |
| 6,935,454 B1* | 8/2005 | Hauser et al. | 180/242 |
| 2005/0167177 A1* | 8/2005 | Roethler et al. | 180/305 |
| 2006/0096799 A1* | 5/2006 | Tatsuno et al. | 180/305 |
| 2006/0254268 A1* | 11/2006 | Yasuda et al. | 60/435 |

FOREIGN PATENT DOCUMENTS

| | | |
|---|---|---|
| JP | 7-329817 | 12/1995 |
| JP | 08284840 | 10/1996 |

OTHER PUBLICATIONS

English-language Abstract of JP 7-329817.

U.S. Appl. No. 11/606,201, filed Nov. 30, 2006.

* cited by examiner

WORK MACHINE HYDRAULICS CONTROL SYSTEM

TECHNICAL FIELD

The present disclosure is directed to a work machine hydraulics control system and, more particularly, to a work machine hydraulics control system having an electronic pressure override feature.

BACKGROUND

Hydraulic systems of work machines may include one or more hydraulic circuits to move one or more work implements and/or to provide propulsion for the machine itself. Each actuator (e.g., a hydraulic cylinder) and/or each drive component (e.g., wheels, tracks, etc.) may be operated with its own dedicated hydraulic circuit. Pressure may build within a hydraulic circuit due to various influences, such as equipment failure or physical resistance to actuation. The pressure within the hydraulic circuit should be regulated to avoid over-pressurizing the hydraulic system.

In a work machine drive train, a hydrostatic transmission may be used in lieu of a mechanical transmission. A hydrostatic transmission may include a variable displacement hydraulic pump and a hydraulic motor, which may also have variable displacement. By varying the displacement of the pump, the amount of fluid pumped to the hydraulic motor may be controlled. Fluid pumping through the hydraulic motor may cause it to spin an output shaft to thereby move a drive mechanism, such as a wheel or track. By varying the ratio between the displacement of the pump and the displacement of the motor, the speed at which the motor is spun may be controlled.

When the movement of a drive mechanism is inhibited by some sort of external resistance, pressure may build within the hydraulic circuit that drives the drive mechanism. For example, a hydraulic circuit that functions to drive the wheels on a wheel loader may experience a rise in pressure when the loader pushes on something that is heavy or substantially immovable, like a large pile of earth. When the loader meets the resistance of the large pile of earth, the forward travel of the loader may be slowed or stopped. The slowing or stopping of the loader may cause the drive wheels to also be slowed or stopped, which, in turn, slows or stops the hydraulic motor that turns the wheels. As the hydraulic motor is slowed or stopped, the flow of fluid through the motor may be substantially inhibited. However, the variable displacement pump may continue to pump fluid to the hydraulic motor. Thus, the continued flow of fluid from the pump can elevate the pressure in the circuit by pumping additional fluid to the motor when the motor does not permit the fluid to flow through. This additional pressure should be relieved and/or prevented to avoid damage to the hydraulic system and possibly other components of the work machine.

A work implement hydraulic system may include an actuator, such as a hydraulic cylinder, to create motion instead of a hydraulic motor. When a work implement meets resistance (e.g., an excavator bucket hitting a rock), the cylinder extension may be stopped. However, the hydraulic pump may continue to pump fluid to the cylinder in an attempt to extend it. The continued flow of fluid may elevate the fluid pressure in the circuit. As discussed above, this pressure build up should be relieved and/or prevented to avoid damage to various systems and components of the work machine.

One way to relieve this kind of pressure build up is with a cross-over relief (COR) valve, which may permit hydraulic fluid to flow (i.e., cross over) from the high pressure side of the circuit over to the low pressure side. This type of pressure relief valve may effectively prevent spikes in pressure. However, continued flow across a COR valve can cause significant heating of the hydraulic fluid due to the pressure drop of the fluid as it passes from the high pressure side to the low pressure side of the system. If fluid is allowed to flow across a COR valve for an extended period of time, the fluid may be heated to levels that may cause damage to system components and/or the fluid itself. Thus, the COR valves may only be suitable for use over short periods of time, (e.g., to prevent sudden spikes in pressure).

Another common way to provide pressure relief is with a pressure override (POR) system. A POR system acts to reduce the displacement of the variable displacement pump, and thus reduce the amount of fluid being pumped to the hydraulic motor (or implement actuator). Hydraulic systems may include POR systems in addition to COR valves. Historically, work machines have been provided with mechanical POR systems, such as spool-type valves that are actuated by the pressure of the fluid itself.

Systems have been developed that utilize an electronic POR. For example, U.S. Pat. No. 5,525,043, issued on Jun. 11, 1996 to Lukich (the '043 patent), discloses a POR system for work implement hydraulics. The system of the '043 patent controls pump displacement based on measurements of pump discharge pressure. The '043 patent also controls pump displacement based on an underspeed control, which is operable to restrict pump output when the load on the engine is greater than the engine is capable of meeting.

The present disclosure is directed toward one or more improvements to existing electronic POR systems.

SUMMARY OF THE INVENTION

In one aspect, the present disclosure is directed to a hydraulic power control system for a work machine. The system may include a hydraulic power output device selected from the group consisting of a hydraulic motor and a work implement hydraulic actuator. The system may also include a variable displacement hydraulic pump configured to supply hydraulic fluid to the hydraulic power output device. The system may further include at least one pressure sensor configured to measure pressure of the hydraulic fluid at a location between the pump and the hydraulic power output device. In addition, the system may include at least one temperature sensor configured to measure a temperature of the hydraulic fluid in the system. The system may include a controller configured to control a displacement of the pump based on a pressure measurement of the at least one pressure sensor and a temperature measurement of the at least one temperature sensor.

In another aspect, the present disclosure is directed to a hydraulic power control system for a work machine. The system may include a hydrostatic transmission including a variable displacement hydraulic motor and a variable displacement hydraulic pump configured to supply hydraulic fluid to the hydraulic motor. The system may also include at least one pressure sensor configured to measure a pressure of the hydraulic fluid at a location between the motor and the pump. The system may further include an underspeed system configured to determine whether an engine of the work machine is operating at a speed below a predetermined speed or decelerating at a rate above a predetermined rate. In addition, the system may include a controller configured to control a displacement of the pump based on information from the underspeed system and a pressure measurement of the at least one pressure sensor.

In another aspect, the present disclosure is directed to a hydraulic power control system for a work machine. The system may include a hydrostatic transmission including a variable displacement hydraulic motor and a variable displacement hydraulic pump configured to supply hydraulic fluid to the hydraulic motor. The system may also include at least one pressure sensor configured to measure a pressure of the hydraulic fluid at a location between the motor and the pump. The system may further include a controller configured to control a displacement of the hydraulic motor based on a pressure measurement of the at least one pressure sensor.

In another aspect, the present disclosure is directed to a method of controlling a hydraulic power system for a work machine. The method may include monitoring a pressure of hydraulic fluid in the hydraulic power system at a location between a variable displacement hydraulic pump and a hydraulic power output device selected from the group consisting of a hydraulic motor and a work implement hydraulic actuator. The method may further include monitoring a temperature of the hydraulic fluid in the system and regulating a displacement of the pump based on the pressure of the hydraulic fluid and the temperature of the hydraulic fluid.

DETAILED DESCRIPTION

Reference will now be made in detail to the drawings. Wherever possible, the same reference numbers will be used throughout the drawings to refer to the same or like parts.

Figure 1:
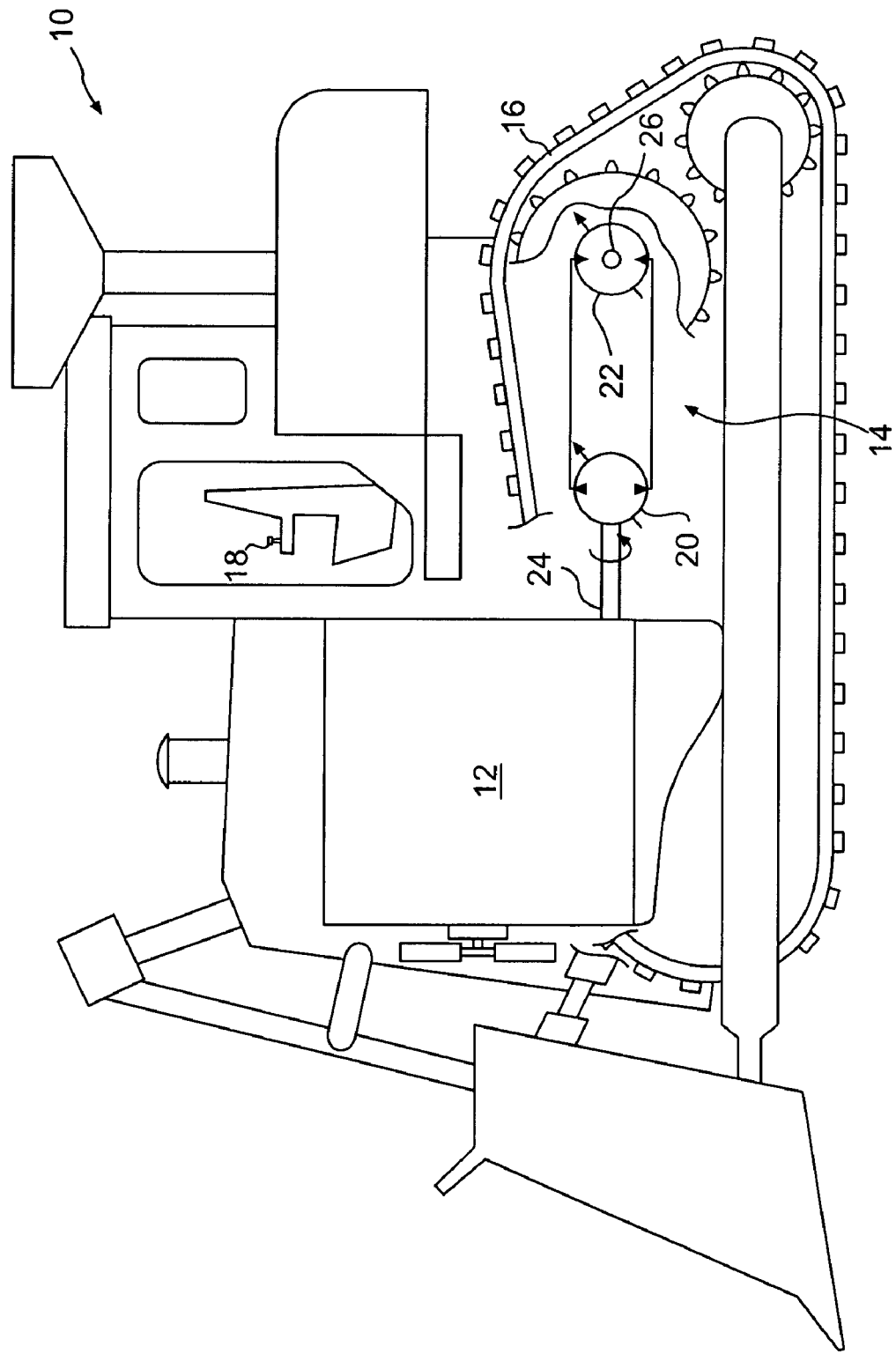
FIG. 1 is a diagrammatic illustration of a work machine according to an exemplary disclosed embodiment.

FIG. 1 illustrates an exemplary embodiment of a work machine 10 having a power source 12 and a hydrostatic transmission 14. Transmission 14 may be operatively coupled to a plurality of traction devices 16 (only one shown in FIG. 1) and may be controlled by a drive input device 18 to impart motion to traction devices 16.

While work machine 10 is illustrated in FIG. 1 as a track type tractor, work machine 10 could be any type of vehicle having, or capable of having, a hydrostatic transmission. For example, in addition to track type tractors, as shown in FIG. 1, work machine 10 may include other types of tracked work machines, such as track type loaders and excavators. Work machine 10 may also include wheeled work machines, such as wheel loaders and fork lifts. Work machine 10 may also include road-going work machines, such as on-road trucks (e.g., dump trucks, semi trucks, etc.) and passenger vehicles.

In view of the broad range of work machines to which the disclosed system is applicable, traction devices 16 may include tracks, belts, wheels, tires, or any other device for moving a work machine. Drive input device 18 may include one or more of a joystick, a lever, a pedal, or any other device for inputting drive commands for work machine 10.

Work machine 10 may include more than one hydrostatic transmission 14. Work machine 10 may include a separate transmission 14 for each of traction devices 16. For example, a wheel loader may include either a single transmission 14, which drives a pair of wheels, or it may include a separate transmission 14 for two or more of the four wheels. A track type tractor may include a separate transmission 14 for each track (see FIG. 2).

Power source 12 may include an engine such as, for example, a diesel engine, a gasoline engine, a natural gas engine, a hydrogen engine, or any other engine apparent to one skilled in the art. Power source 12 may also include other sources of power such as a fuel cell, a power storage device, or any other source of power known in the art.

Figure 2:
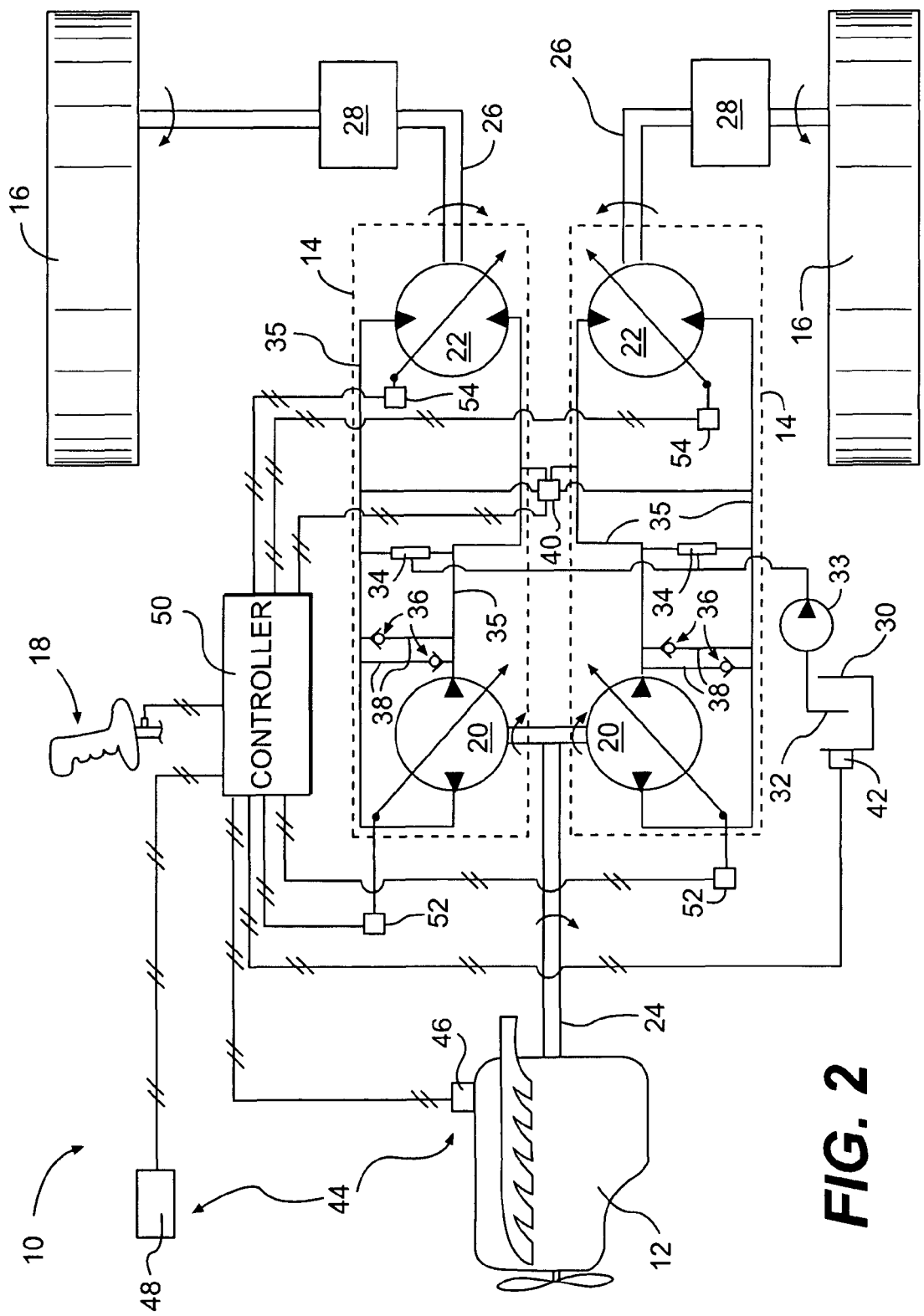
FIG. 2 is a diagrammatic illustration of a work machine drive system according to an exemplary disclosed embodiment.

As illustrated in FIG. 2, work machine 10 may include a dual-path transmission configuration, wherein work machine 10 may include two transmissions. For ease of explanation, however, a single transmission will be discussed. Each transmission is labeled with the same set of reference numbers to refer to corresponding components. Transmission 14 may be connected to power source 12, and may include a hydraulic pump 20 fluidly connected to a hydraulic motor 22. Pump 20 and motor 22 may be variable displacement, variable delivery, fixed displacement, or any other configuration known in the art. Pump 20 may be directly connected to power source 12 via an input shaft 24. Alternatively, pump 20 may be connected to power source 12 via a torque converter, a gear box, or in any other manner known in the art. Transmission 14 may also include an output shaft 26 connecting motor 22 to one of traction devices 16. Each transmission path may include a final drive unit 28 disposed at a location between motor 22 and the associated traction device 16. Final drive unit 28 may include a reduction gear arrangement, such as, for example, a planetary arrangement.

Pump 20 may be configured to draw hydraulic fluid from a reservoir 30, via source line 32, with the assistance of a charging pump 33 and a shuttle valve 34. Pump 20 may be further configured to pump the fluid to hydraulic motor 22, along interconnecting hydraulic lines 35 (e.g., hoses or pipes). Hydraulic lines 35 may form a closed circuit in which one of hydraulic lines 35 may carry fluid from pump 20 to motor 22, and the other of hydraulic lines 35 may carry fluid back from motor 22 to pump 20. Further, the direction of flow may be reversible. The high pressure hydraulic fluid flowing through motor 22 may cause motor 22 to spin, which may result in turning of output shaft 26.

Transmission 14 may include cross-over relief (COR) valves 36 configured to relieve pressure within hydraulic lines 35 when pressure within hydraulic lines 35 exceeds a predetermined pressure limit. The COR pressure limit may be variable, and may also be adjustable. COR valves 36 may be configured to release fluid from the high pressure side of the system across COR valves 36 over to the low pressure side of the system. That is, fluid released by COR valves 36 may be routed via a COR line 38 from one of hydraulic lines 35 (i.e., the one in which the pressure has exceeded the limit) over to the other of hydraulic lines 35.

Work machine 10 may include drive input device 18, a hydraulic line pressure sensor 40, a hydraulic fluid temperature sensor 42, and underspeed control sensors 44, which may include an engine speed sensor 46 and a throttle input sensor 48.

Pressure sensor 40 may be configured to monitor pressure within hydraulic lines 35, between pump 20 and motor 22. A single pressure sensor 40 may be configured to determine a highest pressure of the hydraulic fluid at locations between multiple pumps and the hydraulic motors associated with each respective pump (i.e., within hydraulic lines 35). Alternatively, each transmission and/or each hydraulic line between the pump and motor of each transmission may include a separate pressure sensor.

Temperature sensor 42 may be configured to monitor temperature of hydraulic fluid. Temperature sensor 42 may be located anywhere within the hydraulic circuit. For example, temperature sensor 42 may be configured to monitor temperature of hydraulic fluid within reservoir 30, as shown in FIG. 2.

Work machine 10 may include a controller 50. Controller 50 may include any components that may be used to run an application such as, for example, a memory, a secondary storage device, and a central processing unit. Controller 50 may, however, contain additional or different components such as, for example, mechanical or hydro-mechanical devices. Various other known circuits may be associated with controller 50 such as, for example, power supply circuitry, signal-conditioning circuitry, solenoid driver circuitry, and other appropriate circuitry.

Controller 50 may be configured to receive input information from the various sensors and input devices discussed above. Controller 50 may be further configured to generate control signals for operation of pump 20 and motor 22. Controller 50 may be configured to control displacement of pump 20 and motor 22 by, for example, controlling a pump actuator device 52 (e.g., a solenoid and spool valve) to vary the displacement of pump 20. The displacement of motor 22 may also be controlled by a motor actuator device 54. Controller 50 may control displacement of pump 20 and motor 22 based on information received from drive input device 18, pressure sensor 40, temperature sensor 42, engine speed sensor 46, and throttle input sensor 48. Controller 50 may be in communication with power source 12, pressure sensor 40, temperature sensor 42, pump 20, and motor 22, via control lines, which may carry digital, analog, or mixed types of signals. Alternatively, communication with the various components may be implemented by means of mechanical or hydraulic lines.

Controller 50 may be configured to reduce output of transmission 14 in response to pressure sensor 40 measuring a pressure above a predetermined limit. The pressure limit above which controller 50 may reduce output of pump 20 and/or motor 22 may be variable or adjustable. Output of transmission 14 may be dependent on a ratio between the displacement of pump 20 and the displacement of motor 22. Controller 50 may be further configured to control the ratio between the displacement of the pump 20 and the displacement of motor 22.

Drive input device 18 may generate a control signal that may be received and modified by controller 50 based on information from the other aforementioned input devices. The control signal, modified or unmodified, may be transmitted to hydrostatic transmission 14 and components thereof (i.e., pump 20 and motor 22). For purposes of this disclosure, the terms "modified" and "unmodified" shall refer to whether a control signal has been altered based on pressure override and/or underspeed information. Other forms of signal conditioning known in the art and unrelated to pressure override and underspeed control may be applied to a control signal without "modifying" the control signal for purposes of this disclosure.

Figure 3:
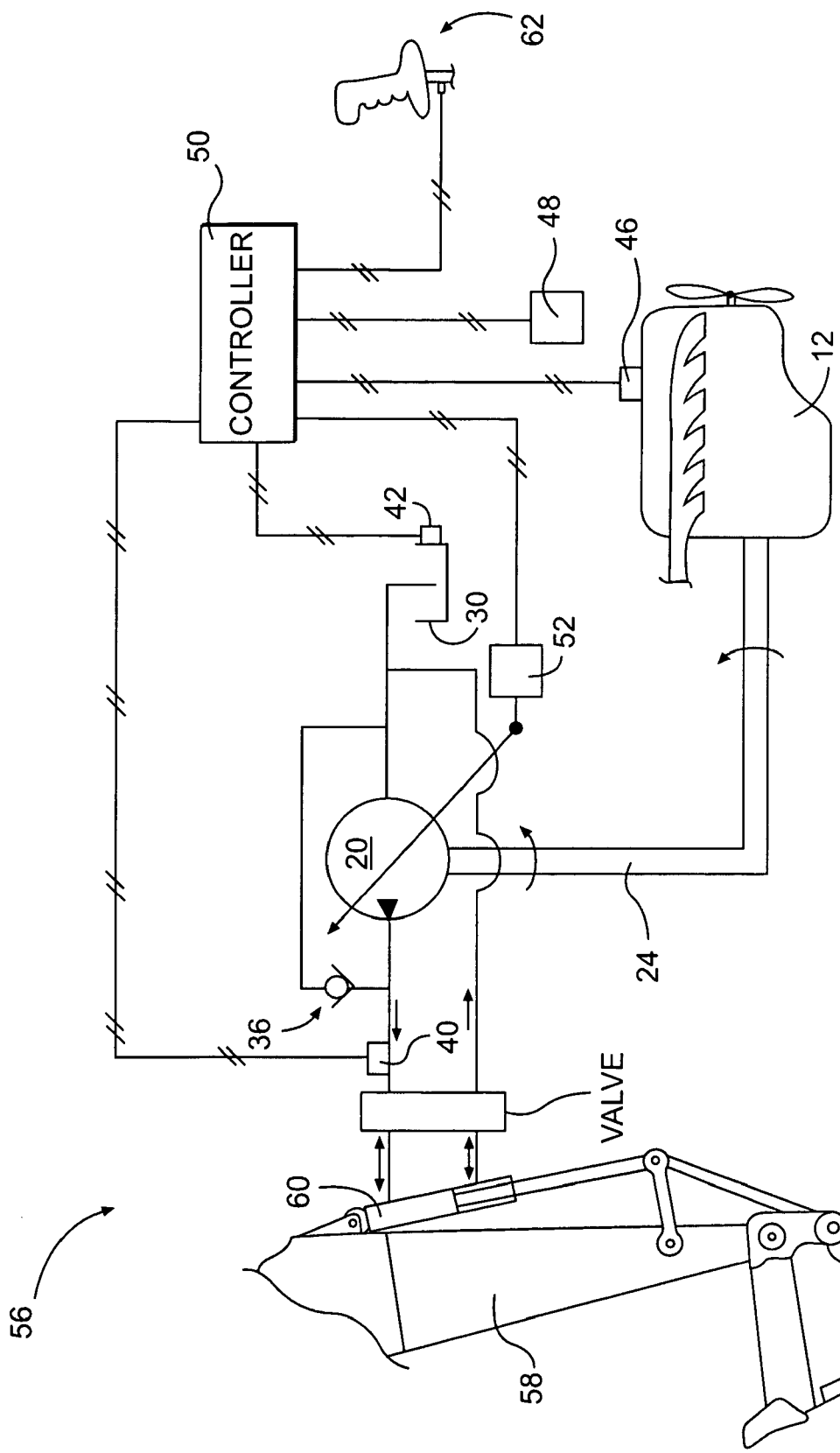
FIG. 3 is a diagrammatic illustration of a work machine work implement control system according to an exemplary disclosed embodiment.

FIG. 3 illustrates an electronic pressure override system as applied to a work implement hydraulic system 56. System 56 may include similar componentry as the embodiment shown in FIG. 2, including power source 12, input shaft 24, hydraulic pump 20, reservoir 30, COR valve 36, pressure sensor 40, temperature sensor 42, controller 50, pump actuator device 52, engine speed sensor 46, and throttle input sensor 48. However, rather than being configured as a hydrostatic transmission, system 56 may be configured to transmit power to a work implement 58. As such, pump 20 may be configured to pump fluid to a different type of hydraulic power output device (i.e., other than a hydraulic motor), such as a work implement hydraulic actuator 60 (e.g., a hydraulic cylinder as shown in FIG. 3) of work implement 58. System 56 may further include an implement control input device 62. Implement control input device 62 may be any type of input device, such as a joystick, lever, etc. as discussed with regard to drive input device 18. Input device 62 may be configured to accept user inputs and generate corresponding control signals for operation of work implement 58. These control signals may be transmitted to controller 50 for processing.

Implement control input device 62 may generate a control signal that may be received and modified by controller 50 based on information from input devices, such as pressure sensor 40, temperature sensor 42, engine speed sensor 46, and throttle input sensor 48. The control signal, modified or unmodified, may be transmitted to hydraulic actuator 60.

Figure 4:
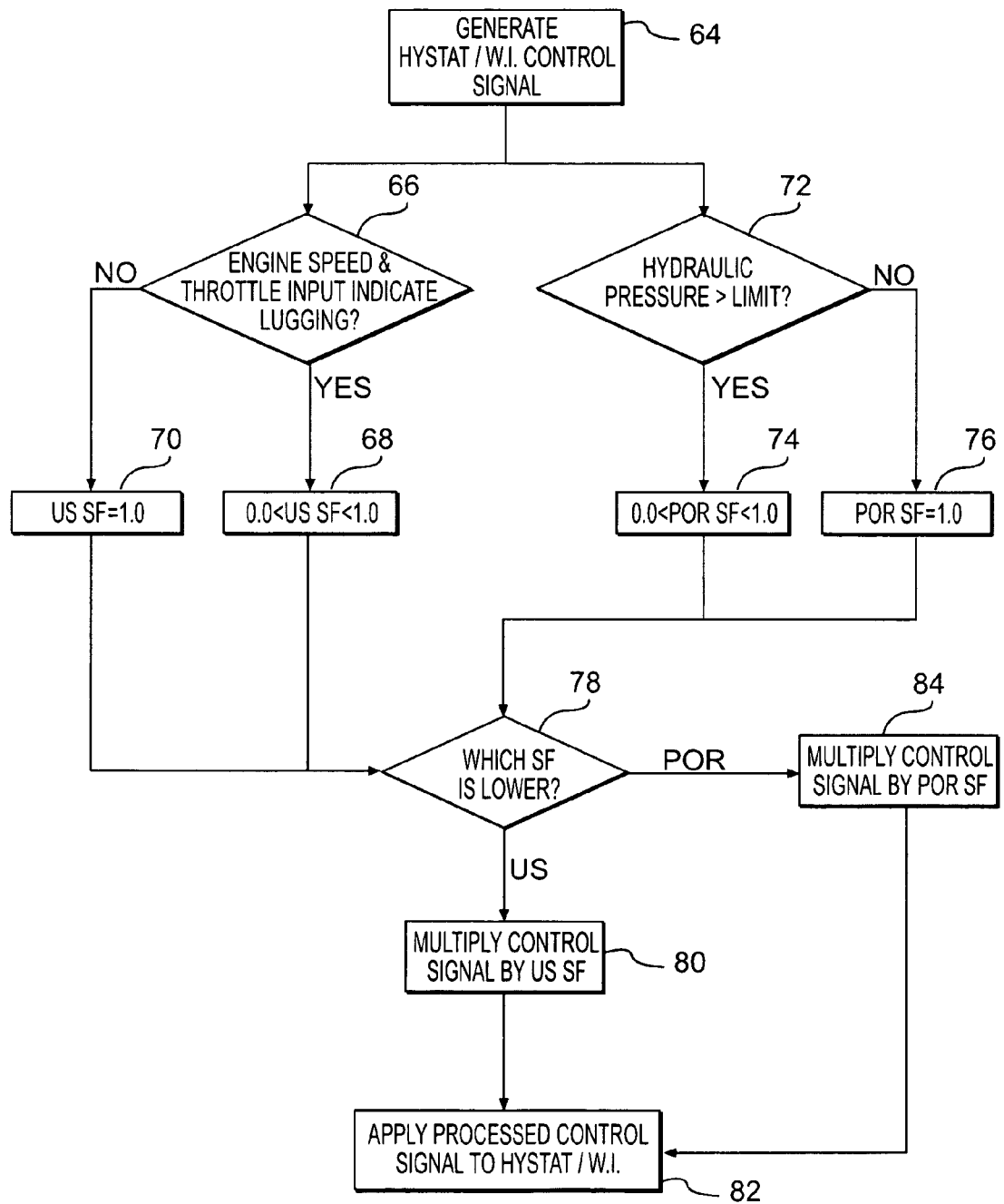
FIG. 4 is a flowchart representation of control logic of a hydraulic power system according to an exemplary disclosed embodiment.

FIG. 4 is a flow chart illustrating a method of operating work machine 10. At step 64, the routine may begin with the generation of a control signal for either a hydrostatic transmission ("hystat") or a work implement ("W.I."). The routine may make several inquiries to determine whether to scale back operation of the hydrostatic transmission or work implement. At step 66, controller 50 may compare a measured engine speed and/or engine deceleration to sensed throttle input. If this comparison results in an indication that the engine is lugging or is about to lug, then controller 50 may generate an underspeed scale factor ("US SF"; step 68) greater than 0.0 and less than 1.0 to reduce hydraulic system output (e.g., how fast hydraulic motor 22 spins or how much hydraulic actuator 60 is actuated). If this comparison results in an indication that the engine is not lugging and is not about to lug, then controller 50 may generate a US SF of 1.0 (step 70).

In addition, controller 50 may determine whether a sensed hydraulic pressure exceeds a predetermined pressure limit (step 72). If the pressure limit is exceeded, then a pressure override scale factor ("POR SF") greater than 0.0 and less than 1.0 may be determined to reduce hydraulic system output (step 74). If the pressure limit has not been exceeded, then controller 50 may generate POR SF to 1.0 (step 76).

At step 78, controller 50 may determine which of the two scale factors is lower (i.e., greater reduction in hydraulic output). If the US SF is lower, then the control signal may be multiplied by the US SF (step 80) and then applied to the hydrostatic transmission or work implement (step 82). If the POR SF is lower, then the control signal may be multiplied by the POR SF (step 84) and then applied to the hydrostatic transmission or work implement (step 82).

Because the control signal is multiplied by a scale factor, the lower the scale factor, the more reduction may be made to the hydraulic system output. Also, if the ultimate scale factor is 1.0 (i.e., both scale factors are 1.0), then no modification would be made to the control signal as the control signal would merely be multiplied by 1.0.

It should be noted that while the control strategy discussed above uses the lower of the POR SF and the US SF, other strategies may be utilized. For example, the scale factors may be combined to provide a more aggressive reduction in hydraulic system output. Such a combination could include, for example, multiplying the POR SF by the US SF, or adding the POR SF to the US SF.

INDUSTRIAL APPLICABILITY

The disclosed electronic pressure override system may be applicable to any hydraulic system susceptible to over-pressurization that could otherwise cause damage or failure in various system components. The disclosed system may be applicable to hydraulic systems of work machines, including components, such as hydrostatic transmissions, hydraulic work implement actuators, or any other type of hydraulic power system components.

The disclosed system may prevent continuous flow across cross-over relief valves in hydrostatic transmissions. By preventing this continuous flow across COR valves, extreme and rapid increases in hydraulic fluid temperature may be avoided. Avoiding such increases in temperature may reduce system power loss and/or oil cooler heat load.

By monitoring hydraulic fluid temperature, variations in fluid properties associated with temperature changes may be accounted for. Properties, such as pressure, viscosity, etc. may vary with fluid temperature. Therefore, POR control may be based on fluid temperature in addition to fluid pressure to provide a more comprehensive control strategy.

In addition, the disclosed system may control both hydraulic pump 20 and hydraulic motor 22 of hydrostatic transmission 14. In contrast, mechanical POR systems for hydrostatic transmissions can only control the pump, as a second POR would be required to control the motor. By utilizing an electronic POR, the disclosed system may control both pump 20 and motor 22 with a single electronic POR, which may provide a broader range of control of transmission 14.

Further, having the POR controlled electronically may provide significant flexibility and/or versatility. For example, electronics may facilitate implementation of a variable and/or adjustable pressure limit. Such variability and/or adjustability may be simply incorporated into the programming of controller 50. An electronic POR may also enable variability of a pressure limit. For example, the pressure limit may be higher during higher speed travel (e.g., above a predetermined threshold speed) of work machine 10 than it is during lower speed travel (e.g., below the predetermined threshold speed). Such a strategy may be conducive to attenuating acceleration at low speeds, thereby providing a smooth take off. In addition, a cold start, auto warm up strategy may be employed, which may utilize a higher pressure limit to permit faster warming of hydraulic fluid by allowing flow across COR valves before the POR becomes active. Further, the pressure limit may be automatically variable based on system operating conditions.

The pressure limit may be readily adjusted by making inputs to controller 50, such as, for example, turning a knob, inputting a value, selecting a predetermined pressure limit from a set of predetermined pressure limits, etc. Such manual adjustments may be made by an owner, operator, service technician, etc.

Also, electronics may maintain control of both pump 20 and motor 22 at all times. In contrast a mechanical POR system may take over and scale back pump output when system pressure gets too high, despite what the controller has commanded the pump to do. By maintaining control of both pump 20 and motor 22, performance of hydrostatic transmission 14 may continue to be monitored, adjusted, and/or customized, while the system is actively overriding a pressurized state.

An additional feature made possible by the disclosed system may include crowd force limiting. Crowd force is the force with which a work machine, such as a loader or track type tractor, pushes into something substantially immovable, such as a pile of earth. By monitoring and varying the maximum rimpull (i.e., the force exertable on the ground at each traction device), the maximum torque experienced by driveline components, such as axles, may be limited to extend the life expectancy of such components.

Diagnostic features may also be facilitated by electronic POR control. For example, an uncommanded track (or wheel) movement detection system may be employed to monitor for pump and/or motor solenoid sticking. Because an electronic POR system maintains control of both pump and motor function at all times, there is always a known, expected amount of track movement for any given operator input to the drive system. The expected track movement may be compared to the expected movement based on a monitored output of the hydrostatic transmission to detect any discrepancies. In contrast, with a mechanical POR system, control of the pump and motor are lost when the mechanical POR system takes over and scales back pump output.

It will be apparent to those having ordinary skill in the art that various modifications and variations can be made to the disclosed work machine hydraulics control system without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. A hydraulic power control system for a machine, comprising:
   a hydraulic power output device;
   a variable displacement hydraulic pump configured to supply hydraulic fluid to the hydraulic power output device;
   at least one pressure sensor configured to measure pressure of the hydraulic fluid at a location between the pump and the hydraulic power output device;
   at least one temperature sensor configured to measure a temperature of the hydraulic fluid in the system; and
   a controller configured to control a displacement of the pump based on a pressure measurement of the at least one pressure sensor and a temperature measurement of the at least one temperature sensor.

2. The system of claim 1, further including an underspeed system configured to determine whether an engine of the machine is operating at a speed below a predetermined speed and whether the engine is decelerating at a rate above a predetermined rate, the controller being further configured to control the displacement of the pump based on information from the underspeed system.

3. The system of claim 1, wherein the controller is configured to reduce the displacement of the pump when the pressure measurement of the at least one pressure sensor exceeds a predetermined pressure limit.

4. The system of claim 3, wherein the predetermined pressure limit is variable.

5. The system of claim 4, wherein the predetermined pressure limit is higher when the work machine is traveling above a predetermined travel speed than it is when the work machine is traveling below the predetermined travel speed.

6. The system of claim 1, further including a cross-over relief valve configured to release hydraulic fluid from a location between the pump and the hydraulic power output device when a pressure of the hydraulic fluid exceeds a predetermined threshold pressure.

7. The system of claim 1, further including:
   at least one additional hydraulic power output device; and
   at least one additional variable displacement hydraulic pump configured to supply hydraulic fluid to the at least one additional hydraulic power output device.

8. The system of claim 7, wherein the at least one pressure sensor is configured to determine a maximum pressure of the hydraulic fluid at a location between each pump and the hydraulic power output device associated with each respective pump.

9. The system of claim 7, wherein the at least one pressure sensor includes multiple pressure sensors, each of the multiple pressure sensors being configured to measure a pressure of the hydraulic fluid at a location between one of the pumps and the hydraulic power output device associated with each respective pump.

10. A hydraulic power control system for a machine, comprising:
a hydrostatic transmission including:
a variable displacement hydraulic motor; and
a variable displacement hydraulic pump configured to supply hydraulic fluid to the motor;
at least one pressure sensor configured to measure a pressure of the hydraulic fluid at a location between the motor and the pump;
an underspeed system configured to collect information about an operating speed of an engine of the machine by determining at least one of:
whether the engine is operating at a speed below a predetermined speed; and
whether the engine of the machine is decelerating at a rate above a predetermined rate; and
a controller configured to control at least one of a displacement of the motor and a displacement of the pump based on the information collected by the underspeed system and a pressure measurement of the at least one pressure sensor.

11. The system of claim 10, wherein the controller is configured to reduce the displacement of the pump when the pressure measurement of the at least one pressure sensor exceeds a predetermined pressure limit.

12. The system of claim 11, wherein the predetermined pressure limit is variable.

13. The system of claim 12, wherein the predetermined pressure limit is higher when the machine is traveling above a predetermined travel speed than it is when the machine is traveling below the predetermined travel speed.

14. The system of claim 10, further including:
at least one additional variable displacement hydraulic motor; and
at least one additional variable displacement hydraulic pump configured to supply hydraulic fluid to the at least one additional hydraulic motor.

15. The system of claim 14, wherein the at least one pressure sensor is configured to determine a maximum pressure of the hydraulic fluid at a location between each pump and the motor associated with each respective pump.

16. The system of claim 14, wherein the at least one pressure sensor includes multiple pressure sensors, each of the multiple pressure sensors being configured to measure a pressure of the hydraulic fluid at a location between one of the pumps and the motor associated with each respective pump.

17. The system of claim 10, further including a cross-over relief valve configured to release hydraulic fluid from a location between the pump and the motor when a pressure of the hydraulic fluid exceeds a predetermined threshold pressure.

18. The system of claim 10, wherein the controller is configured to increase the displacement of the motor when the pressure measurement of the at least one pressure sensor exceeds a predetermined pressure limit.

19. A hydraulic power control system for a machine, comprising:
a hydrostatic transmission including:
a variable displacement hydraulic motor; and
a variable displacement hydraulic pump configured to supply hydraulic fluid to the motor;
at least one pressure sensor configured to measure a pressure of the hydraulic fluid at a location between the motor and the pump;
an underspeed system configured to collect information about an operating speed of an engine of the machine by determining at least one of:
whether the engine is operating at a speed below a predetermined speed; and
whether the engine is decelerating at a rate above a predetermined rate; and
a controller configured to:
control at least one of a displacement of the pump and a displacement of the motor based on a pressure measurement of the at least one pressure sensor and the information collected by the underspeed system by:
determining a first scale factor greater than 0.0 and less than or equal to 1.0 based on the pressure measurement of the at least one pressure sensor;
determining a second scale factor greater than 0.0 and less than or equal to 1.0 based on the information from the underspeed system;
determining the lower of the first scale factor and the second scale factor; and
multiplying a hydrostatic transmission control signal by the lower scale factor.

20. The system of claim 19, wherein the controller is further configured to control a ratio between the displacement of the pump and the displacement of the motor.

21. The system of claim 19, further including:
at least one additional variable displacement hydraulic motor; and
at least one additional variable displacement hydraulic pump configured to supply hydraulic fluid to the at least one additional hydraulic motor.

22. The system of claim 21, wherein the at least one pressure sensor is configured to determine a maximum pressure of the hydraulic fluid at a location between each pump and the motor associated with each respective pump.

23. The system of claim 21, wherein the at least one pressure sensor includes multiple pressure sensors, each of the multiple pressure sensors being configured to measure a pressure of the hydraulic fluid at a location between one of the pumps and the motor associated with each respective pump.

24. The system of claim 19, further including a cross-over relief valve configured to release hydraulic fluid from a location between the pump and the motor when the hydraulic fluid exceeds a predetermined threshold pressure.

25. A hydraulic power control system for a machine, comprising:
a hydrostatic transmission including:
a variable displacement hydraulic motor; and
a variable displacement hydraulic pump configured to supply hydraulic fluid to the motor;
at least one pressure sensor configured to measure a pressure of the hydraulic fluid at a location between the motor and the pump; and
a controller configured to:
modify at least one of a displacement of the pump and a displacement of the motor when a pressure measurement of the at least one pressure sensor exceeds a predetermined pressure limit;

wherein the predetermined pressure limit is higher when the machine is traveling above a predetermined travel speed than it is when the machine is traveling below the predetermined travel speed.

26. The system of claim 25, wherein the controller is configured to modify the displacement of the pump by increasing the displacement of the pump when a pressure measurement of the at least one pressure sensor exceeds a predetermined pressure limit.

27. The system of claim 25, wherein the controller is configured to modify the displacement of the motor by increasing the displacement of the motor when a pressure measurement of the at least one pressure sensor exceeds a predetermined pressure limit.

28. The system of claim 25, wherein the controller is further configured to control a ratio between the displacement of the pump and the displacement of the motor.

29. The system of claim 25, further including a cross-over relief valve configured to release hydraulic fluid from a location between the pump and the motor when the hydraulic fluid exceeds a predetermined threshold pressure.

* * * * *